Dec. 17, 1940.  A. SCHMALENBACH  2,225,354
PROCESS AND APPARATUS FOR THE MANUFACTURE OF CARBON BLACK
Filed Nov. 10, 1937  2 Sheets-Sheet 1

Dec. 17, 1940.  A. SCHMALENBACH  2,225,354
PROCESS AND APPARATUS FOR THE MANUFACTURE OF CARBON BLACK
Filed Nov. 10, 1937  2 Sheets-Sheet 2

Patented Dec. 17, 1940

2,225,354

UNITED STATES PATENT OFFICE 2,225,354

PROCESS AND APPARATUS FOR THE MANUFACTURE OF CARBON BLACK

Adolf Schmalenbach, Essen, Germany, assignor, by mesne assignments, to Koppers Company, Pittsburgh, Pa., a corporation of Delaware Application November 10, 1937, Serial No. 173,875
In Germany November 12, 1936

6 Claims. (Cl. 23—209.6)

The present invention relates to the manufacture of carbon black from hydrocarbon oils, especially those of a high boiling point, such as anthracene oil, naphthalene oil or the like, by burning the oil with a restricted quantity of air and by a sudden cooling down of the combustion products.

The former investigations consisting in making non-agglomerating, valuable carbon black from anthracene oil or similar substances, have failed essentially. If anthracene oil is treated according to the working method, which is, for instance, applied to the manufacture of carbon black from natural gas, a more or less oily product is obtained, which as regards the size of particles and other qualities, cannot compete with the carbon black made from natural gas.

The main object of the present invention is to provide an improved process by which valuable carbon black can be produced from anthracene oil or similar substances. The invention consists essentially in that the anthracene oil to be treated is first of all evaporated in a pipe still or the like, whereupon the vapours developed, preferably after the separation of non-evaporated oil, are mixed up with a gas containing hydrogen, such as hot coal distillation gas, water gas, generator gas, or the like and such a mixture is delivered to the carbon black burners after the addition of preferably warmed-up air.

It has been found that by this method a carbon black may be produced, the properties of which are completely similar to those of the carbon black made from natural gas or the like.

Furthermore, the invention consists in that a mixture of anthracene oil vapour, gas and air to be delivered to the carbon black burners, is kept in circulation in a heated ring pipe line or the like, connecting the various carbon black burners or groups of same. The circulating mixture kept at a certain temperature is added to the freshly generated anthracene oil and to the preheated air.

This improvement according to the present invention is of advantage insofar as it makes it possible to supply the carbon black burners continuously with an oil-gas-air mixture of essentially the same composition and at a uniform temperature. It has been found that this maintenance of the mixture composition and of the mixture temperature is an important factor for the manufacture of carbon black of a good and uniform quality. Due to the fact that a comparatively large volume of oil-gas-air mixture is kept in circulation in front of the carbon black burners, it is possible to compensate the differences existing in the composition of the mixture, resulting during the evaporation of the highly boiling anthracene oil, in such a manner that the composition of the mixture undergoes an alteration immediately in front of the burners, but only within permissible limits. It is, of course, understood that this also applies to the temperature of the oil-gas-air mixture which is changed directly before the carbon black burners.

A still further object of the present invention is to provide an improved evaporator of the pipe still type or the like suitable for evaporating the anthracene oil or the like. The invention consists in that the tubular coil of the pipe still is built as an electrical resistance means and that the so-called Joule-heat produced in the tubular furnace, when passing an electric current through same, is used for heating-up or evaporating the oil.

This characteristic feature of the present invention ensures a uniform and essentially complete evaporation of the anthracene oil at an exactly adjustable temperature which can be maintained safely and thus avoiding any dangerous superheating of the highly boiling anthracene oil, which could not be prevented hitherto. Furthermore, this new and improved heating arrangement of the pipe still permits an exact regulation in the production of the anthracene oil vapour or of the steam quantity generated within the period given. This accurate control is of utmost importance for the manufacture of an oil vapour, gas and air mixture of the necessary uniform composition.

Finally, the invention also comprehends the design of the electrically heated tubular furnace (pipe still) used for evaporating the anthracene oil or other substances, from which carbon black is to be produced.

Other important features according to the invention may be taken from the following description of a preferred embodiment thereof and from the attached drawings, in which.

Figure 1:
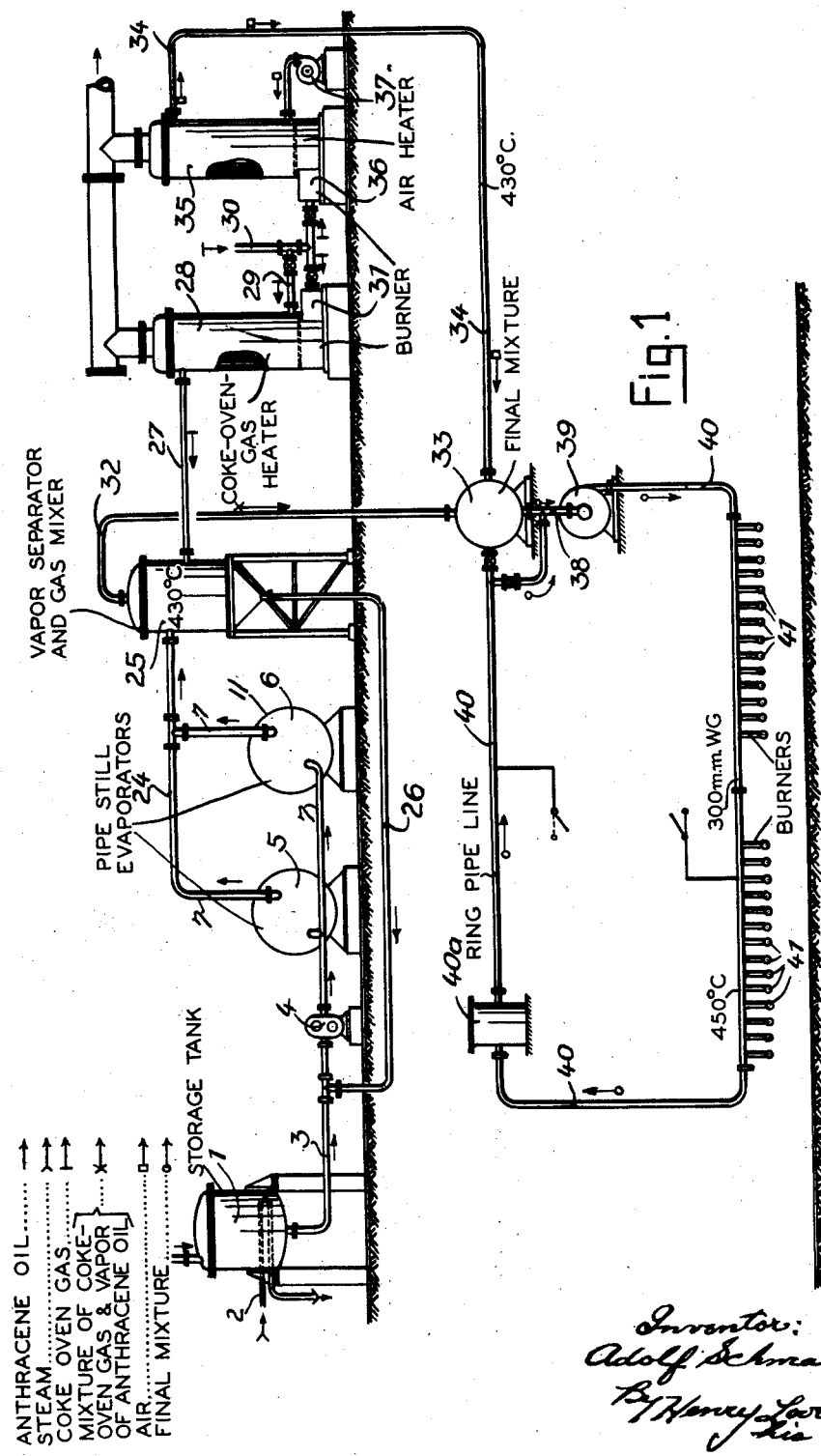
Figure 1 shows more diagrammatically a plant suitable for carrying out the process according to the present invention.

The oil to be treated, for instance anthracene oil, is taken from the storage tank 1, which is provided with a steam heating arrangement 2, through the pipe line 3 to a pump 4, which delivers the anthracene oil into the tubular furnaces 5 and 6 (pipe still). The pipe line 7 is connected to the evaporators 5 and 6 by means of suitable shut-off and regulating devices.

Figure 2:
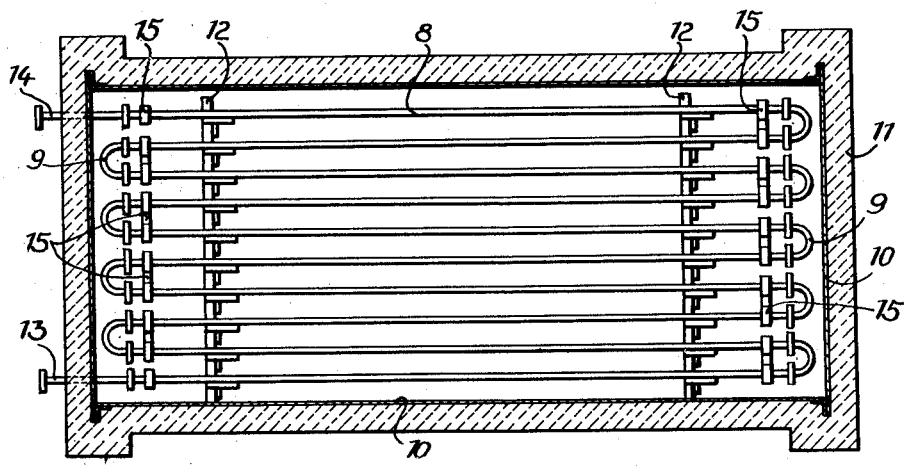
Figure 2 is a vertical, longitudinal section through a pipe still according to the invention.

The evaporators 5 and 6 are constructed as pipe stills, which are fully detailed in Figure 2. The evaporators are built with a pipe coil system, consisting of straight pipe pieces 8 and the pipe bends 9, being interconnected by means of flanges. The pipe system is arranged suitably in a cylindrical casing 10, the outside of which is covered by a heat insulating material 11. Two frames 12 are situated inside the casing, upon which the pipe pieces 8 are supported by inserted materials, which are not electrical conductors, even at an increased temperature, for instance ceramic bricks, mica or the like. In order to prevent warping of the pipe system, when being heated up, the pipe pieces 8 are fastened to the frames 12 so as to be suitably movable in longitudinal direction, for instance by means of insulated pipe hooks. The ends 13, 14 of the pipe system extend through the casing 10 to the outside of same and are provided with flanges, to which are connected the pump line 7 the oil pipe line.

The pipe pieces 8 are connected in pairs at the ends by means of shoes 15, consisting of copper or another suitable conductor, so that the heating stream is not bound to flow through the pipe bends 9. Thus, a superheating and a damage to the flange connection between the pipe bends 9 and pipe pieces 8 is prevented. The pole shoes 15 also serve for fixing the necessary connecting mains of the heating stream.

Figure 3:
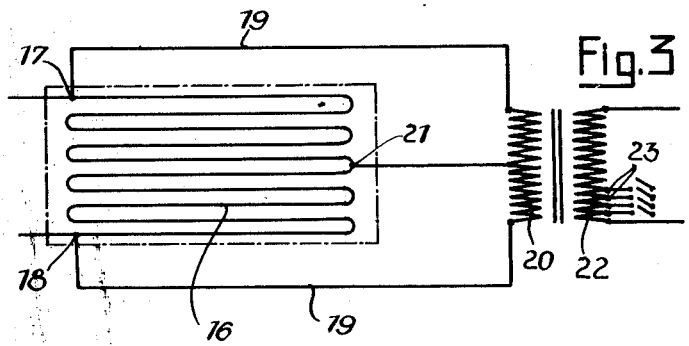
Figure 3 illustrates the essential electrical connections necessary for the pipe still.

The principle of the electrical connection for the pipe still is shown in Figure 3. The heating pipe coil 16 consists of a suitable, electricity conducting material, for instance open-hearth steel. The ends of the pipe coil 16 are connected at points 17 and 18 by means of the pipe line 19, to the ends of the secondary winding 20 of an alternating current transformer. The secondary winding 20 is further coupled with a middle connection 21 to the pipe coil 16. This connection 21 can be attached to the pipe coil in a different way, thus making it possible to raise the temperature in several parts of the coil more than in other parts, for instance for the purpose of superheating the oil produced. The primary winding 22 of the transformer is constructed in such a way that it allows a step-like control or it is provided with a number of points 23, permitting a change in the heating stream on the secondary side and thus a change in the temperature of the heating coil.

As may be seen from Figure 1, the pipe line 24 leads from the pipe still to a tank 25 in which, on the one hand, the non-evaporated anthracene oil is separated from the anthracene oil vapour and, on the other hand, the oil vapour is mixed with a certain quantity of heated-up coke oven gas. The non-evaporated anthracene oil flows through the pipe line 26 back again to the oil main 3, leading to the pump 4. The heated-up coke oven gas is supplied through the pipe line 27, which is in connection with a, preferably gas fired, heater 28, to which is coupled the gas delivery main 29. A part of the coke oven gas is suitably led through the pipe line 30 to a burner 31, which serves for heating-up the indirectly acting gas heater 28.

The mixture of oil vapour and hot coke oven gas leaves the tank 25 through the pipe line 32, reaching a mixing apparatus 33, where hot air is added to the oil vapour mixture. Said air is delivered through the pipe line 34. An indirectly acting heater 35, which is fitted with a gas burner 36, serves for heating-up the air. An air blower 37 delivers the air to the heater 35.

The composition of the oil vapour, gas and air mixture is adjusted in the mixing apparatus 33 as may be necessary for the subsequent manufacture of carbon black. The mixture then passes through pipe line 38, entering a blower 39, which delivers the mixture to a ring pipe line 40. As can be seen from the drawing, the individual burners 41 or groups of same are connected to this ring pipe line leading through said blower. The ring pipe line 40 is provided with a most suitable electrical heating, so that a certain temperature can be maintained at all times. In order to increase the volume of the mixture circulating through the ring pipe line 40, it is possible to install a larger tank 40a into the ring pipe line, if necessary.

The temperatures of the plant are adjusted in such a way that the anthracene oil vapour and the coke oven gas in the mixing tank 25 have a temperature of about 430° C. At the same temperature, the air is preferably supplied from the pipe line 34. The ring pipe line 40 is, however, kept at such a temperature so that the oil-vapour, gas, air mixture in front of the burners 41 has a temperature of about 450° C. The pressure of the mixture in the ring pipe line may be 300 mm. WG.

I have now described in the above the present invention on the lines of a preferred embodiment thereof, but my invention is not limited in all its aspects to the mode of carrying it out as described and shown, since the invention may be variously embodied within the scope of the following claims.

I claim:

1. Apparatus for producing carbon black, comprising: a pipe still furnace system for evaporating oil; means for supplying preheated air; means for supplying preheated gas; mixing means for mixing vapour from the pipe still with air and gas from the preheating means therefor; a carbon-black burner system for burning the mixture from the mixing means; said pipe still furnace system comprising pipe coils constituting electrical resistance means and having means for passing an electric current therethrough for producing Joule-heat in the pipe coils; said pipe coils comprising pipes and return bends interconnected by flanges at opposite ends of the pipes; and said means for passing an electric current comprising shoes connecting the pipes in pairs at their ends so that the electric current does not have to flow through the return bends and their flanges; and said mixing means being communicably connected with the burner system for supply of freshly generated mixture to the burner by conduit means adapted also for cyclic recirculation of a large volume of the mixture from the mixing means to the burners of the burner system and back again to the mixing means without passing through the burners to compensate for differences in composition of the mixture being newly fed to the burners from the mixing means.

2. Apparatus for producing carbon black, comprising: a pipe still furnace system for evaporating oil; means for supplying preheated air; means for supplying preheated gas; mixing means for mixing vapour from the pipe still with air and gas from the preheating means therefor; a carbon-black burner system for burning the mixture from the mixing means; said pipe still furnace system comprising pipe coils constituting electrical resistance means and having means for passing an electric current therethrough for producing Joule-heat in the pipe coils; and said mixing means being communicably connected with the burner system for supply of freshly generated mixture to the burners of the burner system by a ring-like conduit for circulation of a large volume of the mixture in front of the burners and adapted to alter the composition and temperature of the newly added gas by mixture therewith to compensate for differences in temperature and composition of the newly added gas while carrying it to the burners and thus supply the burners continuously with a mixture of essentially the same composition and at a uniform temperature.

3. Apparatus for producing carbon-black comprising: means for supplying oil vapor; means for supplying preheated air; means for supplying preheated combustible fuel gas containing hydrogen as a constituent; means for mixing oil vapor from the supply means therefor with preheated air and preheated combustible gas from the means therefor; a carbon-black burner system; and conduit means for continuous cyclic recirculation of a large volume of said mixture from the mixing means to the burner system and back again to the mixing means without passing through the burners, said conduit means being communicably connected with both the mixing means and the burners of the burner system for taking into mixture with its recirculating gas volume fresh mixture from the mixing means and then feeding the burners with the mixture.

4. A process of manufacturing carbon-black comprising the steps of: evaporating a hydrocarbon oil of the group consisting of anthracene oil, and naphthalene oil; mixing the vapors of the oil with preheated gas containing hydrogen of the group consisting of hot coal distillation gas, water-gas, and generator gas, and with a restricted amount of preheated air for burning to produce carbon-black; burning the mixture with sudden cooling down of the combustion products to produce the carbon-black; and maintaining a large constant volume of the mixture of the oil vapor, gas containing hydrogen, and air, of the composition to be delivered to the burning step, in continuous cycle recirculation from the mixture adjustment step to the burning step and back to the mixture adjustment step; in the mixture adjustment step adjusting the mixture of the oil vapor, gas containing hydrogen, and air, as may be necessary for the carbon-black burning step, and feeding the mixture into the large volume in cyclic recirculation in amount required for delivery to the burning step; and maintaining the temperature of the large volume flowing from the mixture adjustment step to the burning step at a definite temperature higher than that of the freshly fed in mixture, so that the composition and temperature of the freshly fed mixture is altered by said large volume to compensate for difference in composition and temperature of the fresh mixture, in order to supply the burning step continuously with a mixture of essentially the same composition and at a uniform temperature.

5. A method as claimed in claim 4, and in which the hydrocarbon oil employed is anthracene oil, and in which the gas containing hydrogen is hot coal distillation gas, and in which the oil vapour, hot coal distillation gas and air in admixture have a temperature of about 430° C. and the gas in cyclic circulation step is maintained at a temperature of about 450° C. and pressure of about 300 mm. WG.

6. A process of manufacturing carbon-black comprising the steps of: vaporizing a hydrocarbon oil of the group consisting of anthracene oil, and naphthalene oil; mixing the vapors of the oil with preheated gas containing hydrogen of the group consisting of hot coal distillation gas, water-gas, and generator gas, and with a restricted amount of preheated air to produce carbon-black; burning the mixture with sudden cooling down of the combustion products to produce the carbon-black; and maintaining a large constant equalizing volume of the mixture of the composition to be delivered to the burning step continuously in front of the burning step; in the vaporizing step controlling the heating so as to maintain a uniform and complete vaporization of the oil at an exactly adjusted temperature, avoiding any dangerous superheating, with exact regulation of production of oil vapor per unit of time; in the mixing step in amount required adjusting the composition of the mixture as may be necessary for the production of the desired carbon-black and feeding the mixture into the large equalizing volume in front of the burning step for delivery thereto; and maintaining the temperature of the large volume in front of the burning step at a definite temperature, higher than the temperature of the fresh mixture from the mixing step before entering the large equalizing volume, so that the temperature and composition of the mixture fed in freshly from the mixing step is altered by the large equalizing volume before reaching the burning step, in order to supply the burning step continuously with a mixture of essentially the same composition and at the same temperature.

ADOLF SCHMALENBACH.